United States Patent [19]

Streller et al.

[11] 4,256,397
[45] Mar. 17, 1981

[54] PHOTOGRAPHIC SHUTTER

[75] Inventors: Bernd Streller, Fürstenwalde; Heinz Lehmann, Lauenstein, both of German Democratic Rep.

[73] Assignee: Veb Elektronische Erzeugnisse Bärenstein, Bärenstein, German Democratic Rep.

[21] Appl. No.: 35,542

[22] Filed: May 3, 1979

[51] Int. Cl.³ .............................................. G03B 9/18
[52] U.S. Cl. .................................................. 354/250
[58] Field of Search ............... 354/226, 235, 250-253, 354/261-265, 254-260, 234

[56] References Cited

U.S. PATENT DOCUMENTS

| 520,696 | 5/1894 | McCollom | 354/263 |
| 549,681 | 11/1895 | Packard | 354/263 |
| 1,881,904 | 10/1932 | Owens | 354/265 X |
| 3,526,455 | 9/1970 | Barnette | 354/265 X |
| 4,003,067 | 1/1977 | Braunning | 354/261 X |

FOREIGN PATENT DOCUMENTS

| 52255 | 9/1889 | Fed. Rep. of Germany | 354/255 |
| 2234913 | 1/1974 | Fed. Rep. of Germany | 354/234 |

Primary Examiner—John Gonzales
Attorney, Agent, or Firm—Montague & Ross

[57] ABSTRACT

A shutter for a photographic instrument comprises a support on which more than two sectors are swingably mounted and a rectilineally shiftable actuating member connected to the sectors for swinging same from a position in which the sectors block an opening in the support into a position in which the opening is adapted to pass light.

3 Claims, 6 Drawing Figures

4,256,397

PHOTOGRAPHIC SHUTTER

FIELD OF THE INVENTION

The present invention relates to a shutter of the type in which a plurality of shutter sectors are swingable upon a support and, more particularly, to an improved lightweight low-friction rapidly operating shutter.

BACKGROUND OF THE INVENTION

It is known to provide a shutter having at least two shutter sectors which are swingably mounted upon a support and are adapted to block a shutter opening upon swinging movement in one direction and to expose this opening or permit light to pass therethrough upon swinging movement in an opposite direction.

Shutters of this type have been provided with rectilineally shiftable elements to actuate the shutter sectors (two in number). In an alternative conventional construction, a multiplicity (more than two) sectors are provided for actuation by a control ring which is concentric with the opening and is rotated to swing the sectors between their extreme positions.

Both of these conventional systems have the disadvantage that the individual sectors have a relatively high inertia and thus limit the shutter speed. The concentric-ring structure is, in addition, a complicated mechanism capable of failure and of poor reliability. High friction losses also arise in the earlier systems.

OBJECTS OF THE INVENTION

It is an object of the present invention to provide an improved photographic shutter.

Still another object of the invention is to provide an improved photographic shutter which obviates the disadvantages enumerated above.

It is also an object of this invention to provide a shutter which can be operated by a simple mechanism and which has low inertia and low friction losses so that it can be actuated at especially high speeds.

SUMMARY OF THE INVENTION

These objects are attained, in accordance with the present invention, in a shutter which comprises a support provided with a shutter opening and a multiplicity of swingable sectors (more than two) which are adapted in one angular position of each of the sectors, to block the opening and in another angular position to clear the opening, i.e. to be swung past the boundaries of the opening, thereby permitting light passage through the opening. According to the invention, a rectilineally shiftable actuating member is mounted on the support and is operatively connected with the sectors, e.g. by entraining members or pins, for swinging these sectors between the extreme positions thereof.

Advantageously, the sectors are pivotally mounted upon the support so that the translational movement of the actuating element can be transmitted via the aforementioned pins, preferably through selective slots in the support, to the individual sectors.

When the pins are located outwardly of the pivots, the sectors can be swung in a movement of an actuating tongue of the actuating member away from the support while, in another embodiment of the invention, the pins may be connected to the sectors inwardly of their respective pivots so that the opening movement is caused by a movement of the actuating tongue toward the supports.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
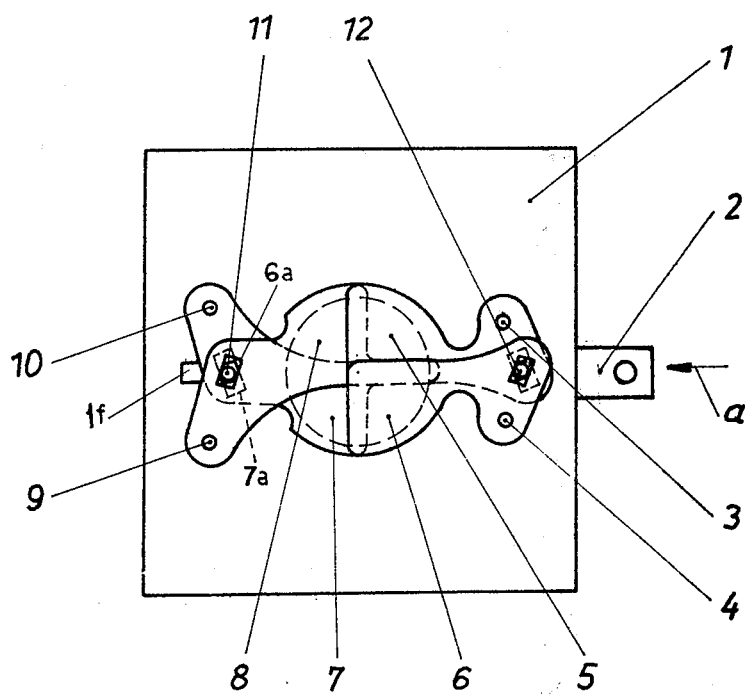
FIG. 1 is an elevational view of a photographic shutter according to the invention, partly in diagrammatic form, with the shutter shown in its closed position.

FIG. 1 shows a shutter whose baseplate 1 is provided with an opening 1a (FIG. 1A) and below which an actuating element 2 is so arranged that its displacement in the direction a relative to the baseplate 1 through a stroke s is possible. The baseplate 1 carries the shutter sectors 5 and 6 with their fixed pivot points 3 and 4 and with respective slots engaged by a pin 12 forming an entraining member. The pin 12, which also passes through a slot in the baseplate 1, is carried by the actuating element 2.

In addition, the closure sectors 7 and 8 are provided with fixed pivot points 9 and 10 on the baseplate 1 and are engaged by a pin 11 also carried by the actuating element and passing through a slot shown partly at 1f in FIG. 1 in the baseplate. The sectors 6 and 7 also have slots 6a and 7a in which the pin 11 engages.

Figure 2:
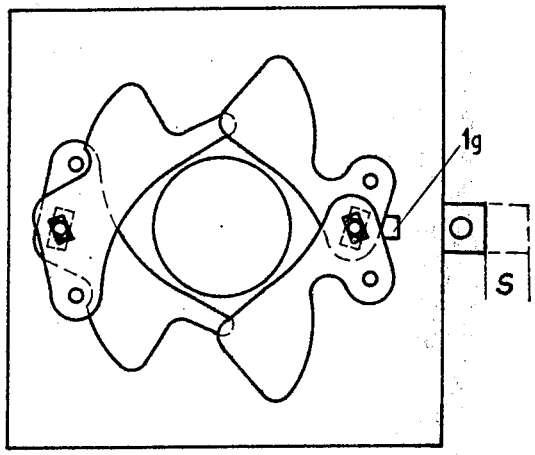
FIG. 2 is a view similar to FIG. 1 with the sectors in their shutter-open positions.

Upon a displacement of the actuating element 2 in the direction a through the stroke s, the pins 11 and 12 engage the sectors and swing them into their open position shown in FIG. 2 since the sectors are engaged by the pins inwardly of their pivots 3, 4, 9, 10. The open position of the shutter is thus shown in FIG. 2 from which the other slot 1g in the baseplate will be apparent.

Figure 1A:
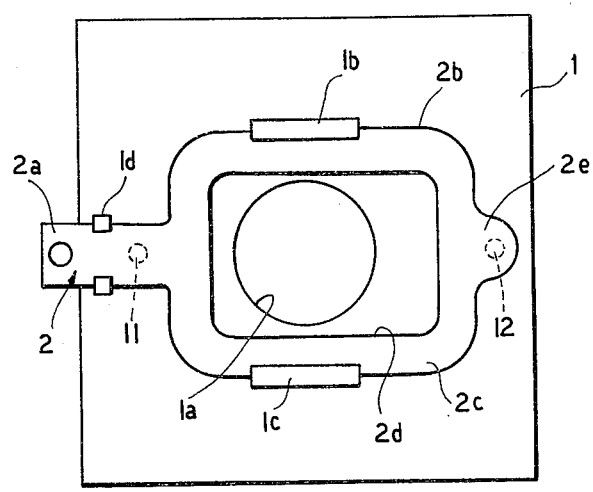
FIG. 1A is an elevational view of the opposite side of the shutter showing the actuating element in detail.

Referring now to FIG. 1A, it will be evident that the actuating element 2 is provided with a tongue 2a which can be formed with a hole engageable by a shutter-actuating structure, the hole forming a pivot or an anchor for a cable or the like. The tongue 2a is guided in the guides 1d of the plate 1 which also is formed with guides 1b and 1c for the opposite sides 2b and 2c of the actuating element 2. A tailpiece 2e of this actuating element carries the pin 12.

Figure 3A:
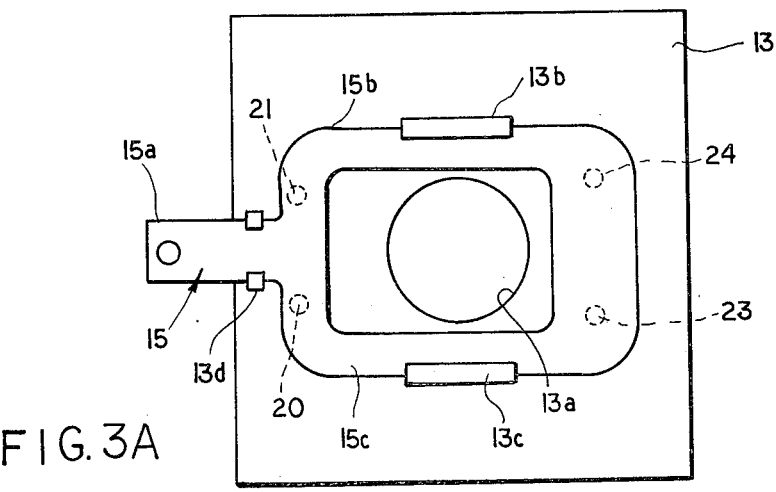
FIG 3A is a view similar to FIG. 1A of the shutter of FIG. 3.
Figure 3:
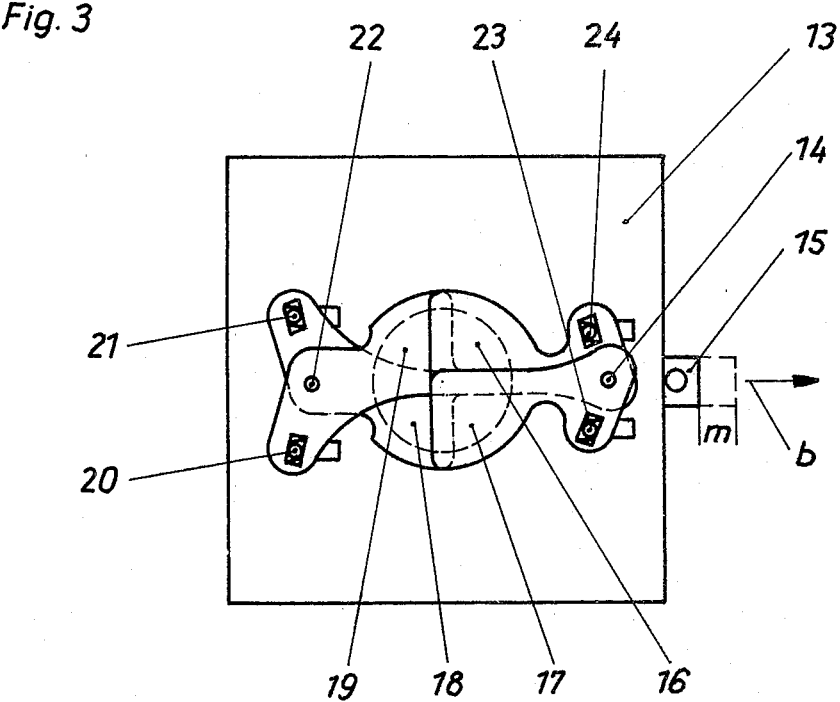
FIG. 3 is a view similar to FIG. 1 of another embodiment of the invention in which the pivots of the shutter sectors are movable, the shutter being closed in the embodiment of FIG. 3.
Figure 4:
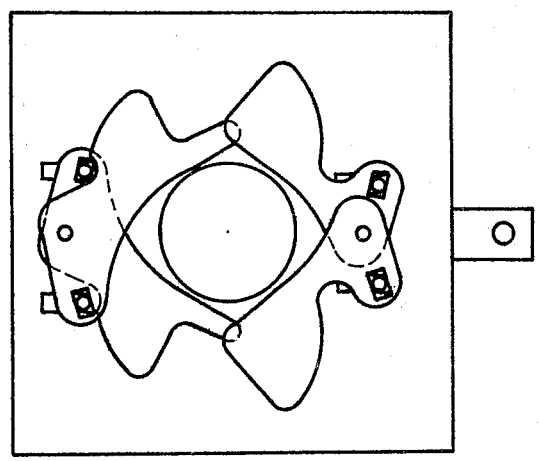
FIG. 4 is a view similar to FIG. 3 of the shutter thereof in an open position.

FIG. 3 shows an embodiment of the invention in which the support 13 carries a pair of shutter sectors 16 and 17 as well as the shutter sectors 18 and 19. In this case, each pair of shutter sectors is pivotally connected together by the movable pivots 14 and 22 while the sectors are retained on the support plate 13 by the entraining pins 23, 24 and 20, 21, respectively, passing through slots of the baseplate 13. The entraining pins 20, 21 and 23, 24 are mounted upon the actuating element 15 which is displaceable from its closed position shown in FIG. 3 to its open position shown in FIG. 4 through the distance m in the direction of arrow b.

As can be seen from FIG. 3A, the pins 20, 21, 23, 24 are mounted upon the actuating element 15 which has a tongue 15a provided with a hole engageable with the shutter actuating mechanism and guided at 13d on the plate 13. Guides 13b and 13c of the plate also engage the sides 15b and 15c of the actuator which has a central opening dimensioned not to block the shutter opening 13a.

We claim:

1. A photographic shutter comprising:

a support plate formed with a window;

four sectors disposed on one side of said support plate;

an actuating element on the opposite side of said support plate rectilinearly shiftable thereon and formed with an actuating tongue, an opening through which said window is exposed in all positions of said element, a pair of arms straddling said window, and a connecting piece interconnecting said arms opposite said tongue;

a first set of at least two pivot pins each pivotally connecting said sectors to said plate whereby said sectors are each swingable about the pivot pins of said first set between a position in which said sectors clear said window and a position wherein said sectors overlie and collectively block said window; and a second set of at least two pivot pins pivotally connecting said sectors to said actuating elements at locations spaced from the pivot pins of said first set for swinging said sectors between said positions upon displacement of said elements, said plate being formed with respective slots extending in the direction of displacement of said element and respectively traversed by said pivot pins of said second set.

2. The shutter defined in claim 1 wherein said first set of pivot pins comprises four pivot pins each pivotally connecting a respective one of said sectors to said plate at a location fixed on said plate, said second set of pivot pins comprising a pair of pivot pins aligned in the direction of displacement of said element and guided in respective slots of said support plate.

3. The shutter defined in claim 1 or claim 2 wherein the pins of said first set are disposed outwardly of the pins of said second set.

* * * * *